United States Patent
Lutz

[11] 3,714,822
[45] Feb. 6, 1973

[54] PROCESS FOR MEASURING WEAR ON A DRILLING TOOL

[75] Inventor: Jean Lutz, Pau, France

[73] Assignee: Societe Nationale des Petroles d'Aquitaire, Paris, France

[22] Filed: Nov. 9, 1970

[21] Appl. No.: 87,700

[30] Foreign Application Priority Data

Nov. 12, 1969 France................6938645

[52] U.S. Cl..................................73/104, 73/71.4
[51] Int. Cl..........................................G01n 29/00
[58] Field of Search..........73/71.4, 104, 151; 175/39

[56] References Cited
UNITED STATES PATENTS

| 3,548,648 | 12/1970 | Weichbrodt et al.............73/104 |
| 3,486,375 | 12/1969 | Redwine et al.............73/71.4 X |
| 3,455,149 | 7/1969 | Foster et al.............73/71.4 |

Primary Examiner—James J. Gill
Assistant Examiner—Arthur E. Korkosz
Attorney—Holcombe, Wetherill & Brisebois

[57] ABSTRACT

The wear on a drilling tool is measured by picking up certain vibrations produced by rotating said tool, which vibrations have a component indicative of the extent to which the tool has worn. The indicative component may be at least partially isolated so as to produce a more exact result.

9 Claims, 9 Drawing Figures

*uses vibration amplitude peaks at particular multiple frequencies to determine degree of wear*

PROCESS FOR MEASURING WEAR ON A DRILLING TOOL

The present invention relates to a process for measuring the extent of wear on a tool during drilling. A conventional drilling tool makes use of two or more cones or cutting wheels, which rotate against the bottom of the bore hole as a result of the rotary movement of the tool driven by the line of rods or a drilling turbine. The teeth of the cutting wheels, under the load of the rod blocks, cause breakage and grinding of the rocky formations, and are consequently subject to progressive wear.

It is important to know the extent of wear, since this allows speed of rotation of the drilling tool to be most suitably regulated, and replacement to be carried out when necessary. Inspection of the tool by raising the line of drilling rods is impractical, because of the time wasted during such an operation.

During their earlier work, the inventors of the present invention began to pay particular attention to the spectrum of vibrations emitted by the drilling tool during drilling operations, and their observations have already led to the embodiment of a process to measure the lithographic properties of rock.

According to the invention, the extent of wear in a drilling tool is measured by studying the shape of the spectrum of vibrations emitted by the tool during drilling.

The process according to the present invention consists more particularly of recording, at one point at least on a drilling assembly, one or more signals which are representative of the vibratory state of the said assembly, eliminating, from the signal thus obtained, the fraction of amplitude, in absolute value, that is above a pre-fixed level, selecting at least one frequency band in the processed signal, and measuring at least one quantity of at least one frequency band thus selected, the said quantity characterizing the extent of wear on the drilling tool.

One embodiment of the process according to the invention consists of selecting one frequency band about 10 Hz wide in a vibration spectrum, centered on the first or second harmonic of the maximum amplitude frequency, and another frequency band of the same width, centered on the portion of the trough between the second and third harmonics, and working out the ratio between the average amplitudes of the vibrations in these two frequency bands, a ratio of more than 2 showing that the tool is new, and a ratio of 1 or thereabouts that it is extremely worn.

Another embodiment of the process according to the invention consists of selecting a frequency band of between 40 and 100 times the frequency of rotation of the tool, and measuring the average amplitude of the signal in this frequency band; this amplitude varies according to the extent of wear on the drilling tool.

The process according to the invention enables one to trace the progress of wear on the tool during drilling, and the equipment needed to gather, process and transmit the necessary signals can be used with a standard drilling installation without interfering with its normal operation.

It will be easier to understand the invention from the description of embodiments of the process, in accordance with the drawings.

Figure 1:
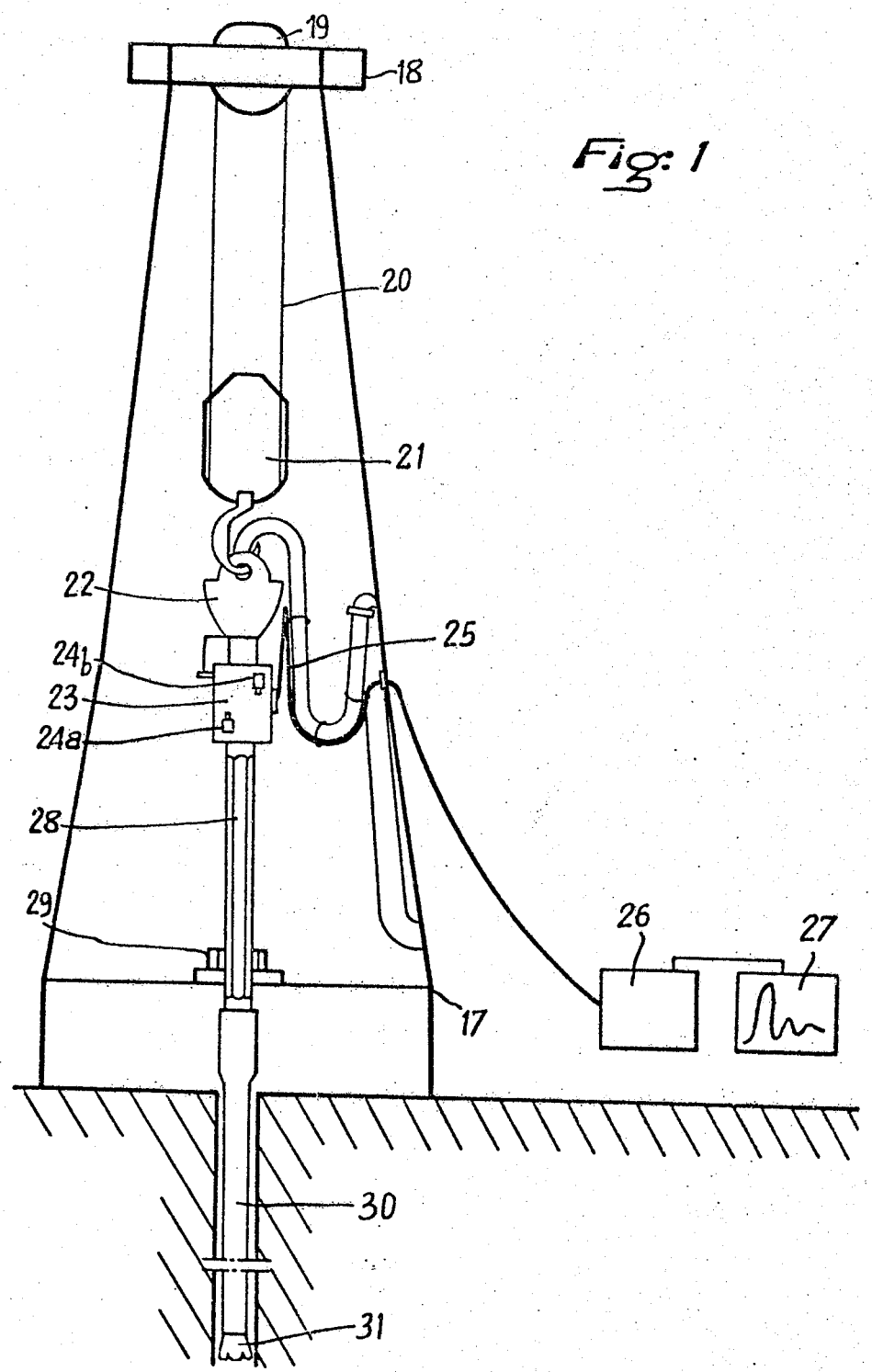
FIG. 1 shows a measuring device using two vibration sensors placed at the upper end of the drilling assembly, near the square rod.

FIG. 1 shows the device for sensing the vibrations of the line of drilling rods. The derrick 17 supports a platform 18, to which are attached the pulley-axles 19. The cables 20 provide the rigging between the unit 19 and the set of pulleys 21, which carry the drilling-fluid injection head 22, on a hook. This injection head in turn carries a coupling 23 connecting it with the driving rod 28. The vibrations emitted as the result of the drilling of the ground by the tool teeth are picked up inside the coupling, already known; the signals received may be emitted by the radio-electric emitting device placed in the coupling and transmitted to a measuring system placed within a short distance and equipped with an antenna. The coupling 23 carries two accelerometers 24a and 24b (indicated in dotted lines in the figure), fitted in opposition on two diametrically opposite generating lines on the coupling; these accelerometers are connected by a ring-brush system to the cable 25, which transmits the signals received to the processor 26.

This processor 26 includes a voltage limiter, which will be described in connection with FIG. 10. This unit is followed by an adjustable band filter which selects one or more frequency bands in the vibration spectrum, and works out the average amplitude of the vibrations in this band. The vibration spectrum obtained by shifting the variable frequency band, which may be described as the "window," is recorded at 27. The drive rod 28 is made to rotate by the rotary table 29, and carries the line of rods 30 at the end of which is attached a cutting-wheel drilling tool 31.

Figure 2:
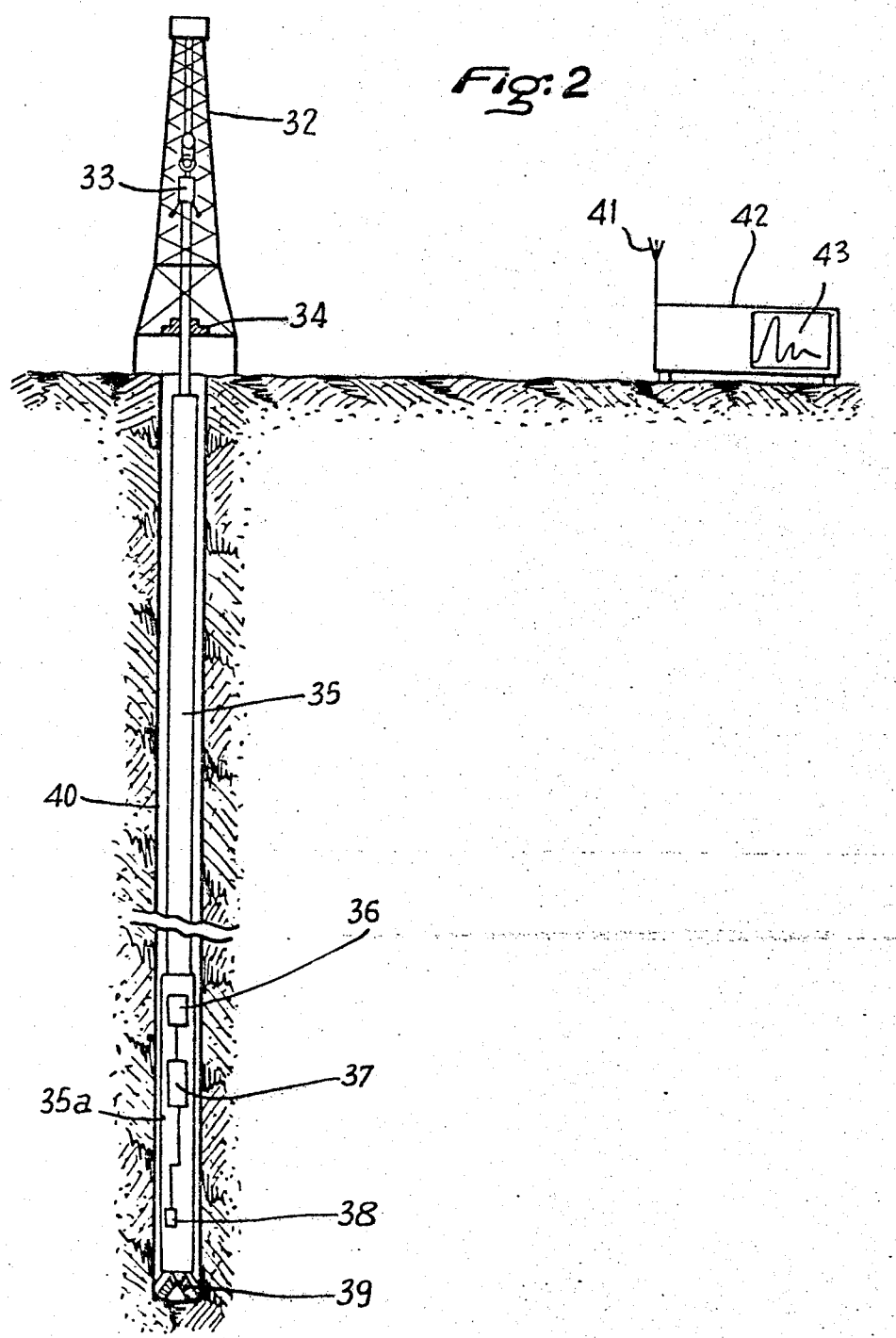
FIG. 2 shows a measuring device using a single sensor situated near the tool at the bottom of the well.

FIG. 2 illustrates another vibration measuring device, in which a derrick 32, with its rigging, carries a coupling linked to the drilling assembly 35.

This assembly is made to rotate by the table 34.

At the base of the drilling assembly, in a coupling 35a, there is a transmitter 36 fed with signals by a voltage selector 37, which receives the vibrations emitted by the tool, by means of a single accelerometer 38. The tool 39 bites into the rock, drilling out the well 40. The vibrations picked up by 38 are limited in voltage by the device 37, which then selects a frequency band. The variable band is shifted in the spectrum so as to scan it, or else a fixed device with pre-set frequencies picks up several frequency bands with pre-set values. The corresponding signals are transmitted, by means of the transmitter 36, acting by mud pressure or by magnetostriction, to the coupling 33, which picks up the signals omitted by 36 and applies them to the input of a radio-electrical emitting device, emitting in single frequency or in modulations in the direction of the processing unit 42 equipped with the antenna 41. The signals may be decoded and the amplitude measured and recorded at 43.

Figure 3:
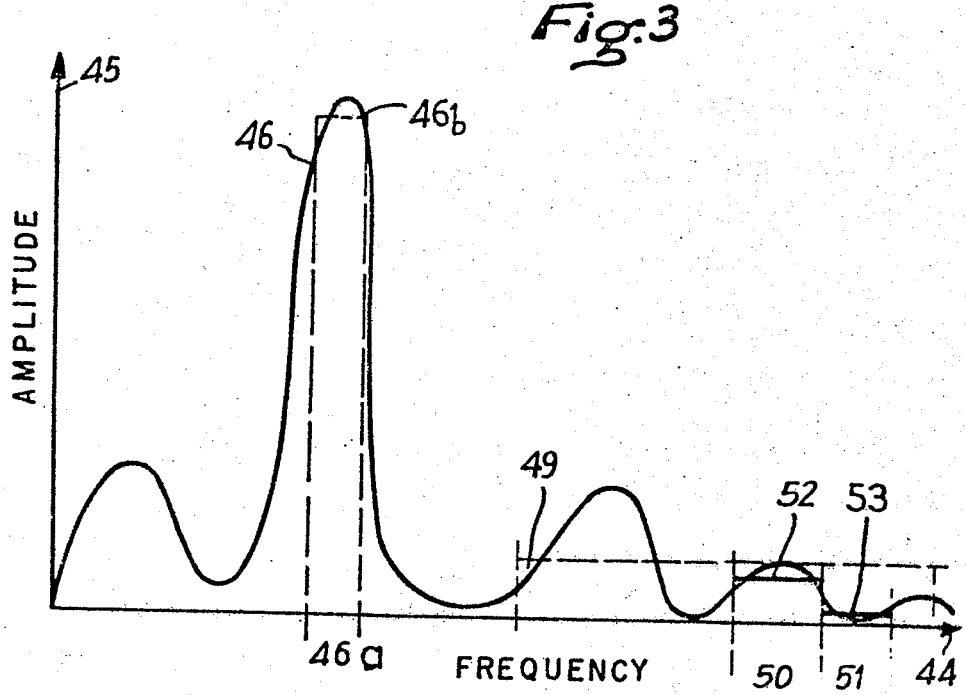
FIGS. 3, 4 and 5 show spectra for the tool when new, 50 percent worn and 90 percent worn respectively, and the same two frequency bands selected in each of these spectra.
Figure 4:
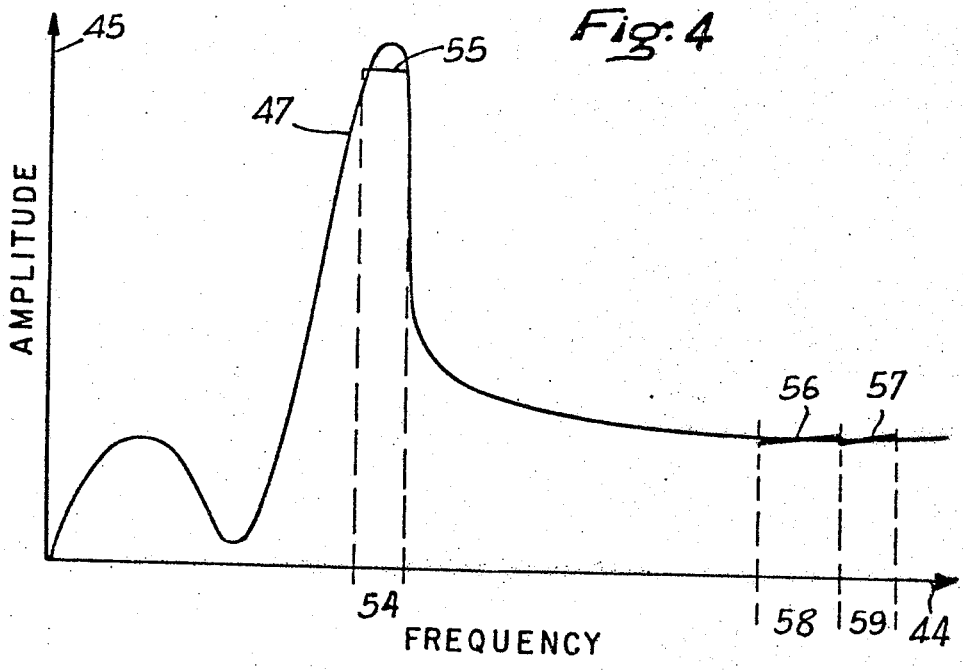
Figure 5:
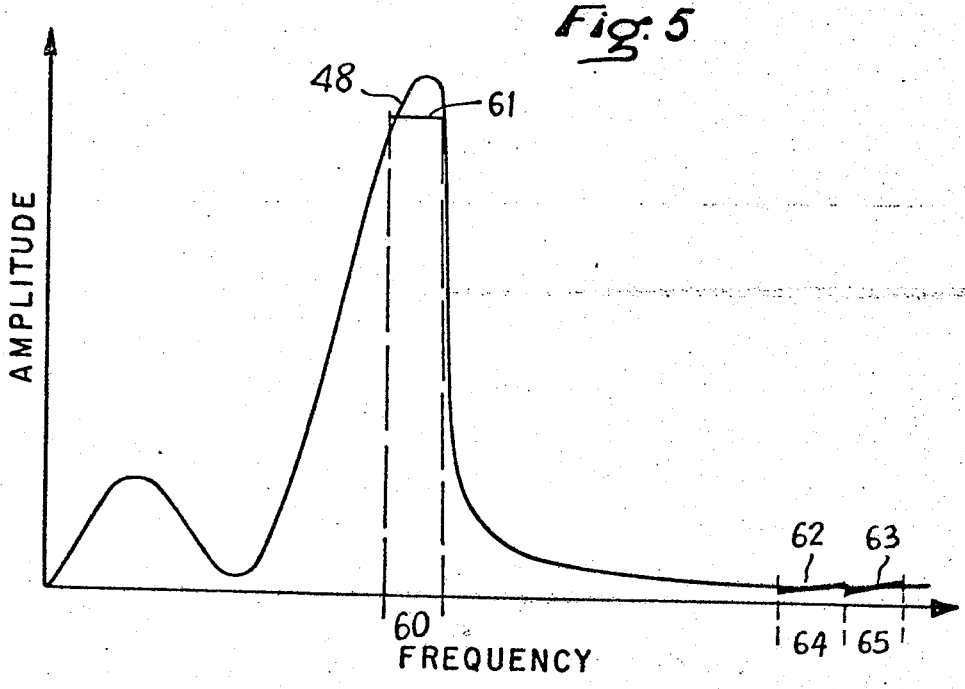

FIGS. 3, 4 and 5 show the vibration spectra for a tool showing differing degrees of wear. The spectrum of frequencies for a new tool is represented by the curve 46 (FIG. 3); the frequency spectrum for a tool showing medium wear is represented by the curve 47 (FIG. 4), while the frequency spectrum for a very worn tool is represented by the curve 48 (FIG. 5).

The abscissa 44 represents the ratio between the frequency measured and the frequency of rotation of the drilling assembly, while the ordinate 45 represents the amplitude of the vibrations.

The spectrum shown in FIG. 3 corresponds to a new tool. It includes a peak 46b of maximum amplitude in the frequency band 46a, which is 2 Hz wide. The extent of wear may be measured as follows.

If the vibrations are selected in a more limited frequency band, as shown at 50, corresponding to the second harmonic, in other words with an abscissa equal to three times the abscissa 46a, it will be found that the vibration amplitude in this frequency range has a certain level 52. If the amplitude of the vibrations in the frequency band 51 centered on an abscissa equal to three and a half times the abscissa 46a is measured simultaneously, a low average amplitude will be observed, represented at 53. If the ratio between the amplitudes 52 and 53 is then worked out, it will be found to be high, around 3, for a new tool.

In practice it has been found that a high ratio between the amplitude of the vibrations included in the frequency range corresponding to the second harmonic and the amplitude corresponding to the trough between the second and third harmonics corresponds to a slightly worn tool. If the ratio between these frequencies is close to 1, on the other hand, the tool is very worn.

The average amplitude of vibrations with higher frequencies can also be measured. For instance, a fairly wide window may be used, and the frequencies between 40 and 100 times the rotating frequency measured. Where the drilling assembly is rotating at 120 rpm, for example, the frequency examined is between roughly 80 and 200 Hz. By making use of the device described in a former application in the name of the applicant, the amplitude of the vibrations in this frequency band can be measured; the said amplitude is shown at 49.

The spectrum shown in FIG. 4 corresponds to a tool showing 50 percent wear. In the frequency bands 58 and 59, the first of which corresponds to the second harmonic and the second to the trough between the second and third harmonics, it is observed that the vibration amplitude is roughly equal. These amplitudes are shown at 56 and 57. The ratio between amplitude 56 and amplitude 57 is close to 1, a ratio which characterizes a partly worn tool.

The method of examining the average amplitude of vibrations of higher frequencies shows that a frequency band of this type, 54, ranging from 40 to 100 times the frequency of rotation, has a higher average amplitude (average value of amplitudes 56 and 57) than amplitude 49, corresponding to the spectrum for a new tool.

FIG. 5, shows the frequency spectrum for a tool showing 90 percent wear, using the same system of coordinates. It is found that the ratio between the amplitudes in frequency bands 64 and 65, corresponding to the harmonics referred to above, is close to 1. The amplitudes are shown at 62 and 63. In contrast to FIG. 6, the average amplitude in high frequencies (average value of 62 and 63) is very low, indicating a tool that has become practically unusable.

Figure 6:
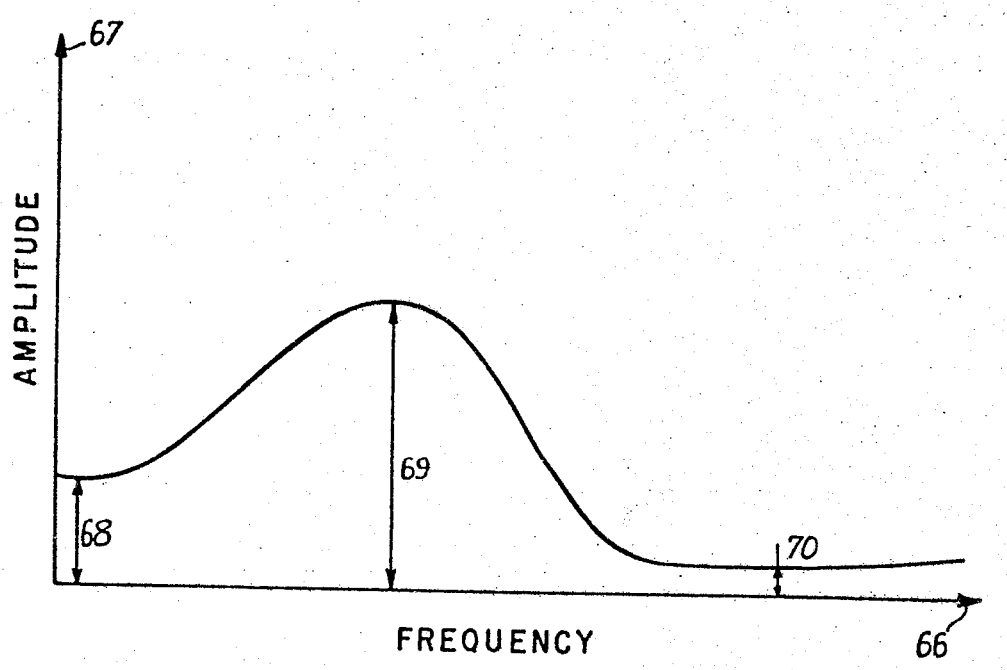
FIG. 6 shows the variation in the amplitude of the band selected, in relation to the length of use of a tricone.

In FIG. 6, the abscissa 66 represents the working time for a cutting-wheel drilling tool, and the ordinate 67 represents the amplitude measured in a frequency band ranging from 40 to 100 times the rotating frequency. For a new tool this amplitude is fairly low (68). When wear has begun, the amplitude rises to the level shown at 69, and then falls to the low level shown at 70.

The beginning of the level 70 indicates that the cutting-wheel tool is completely worn out, and that the time has come to change it.

Figure 7:
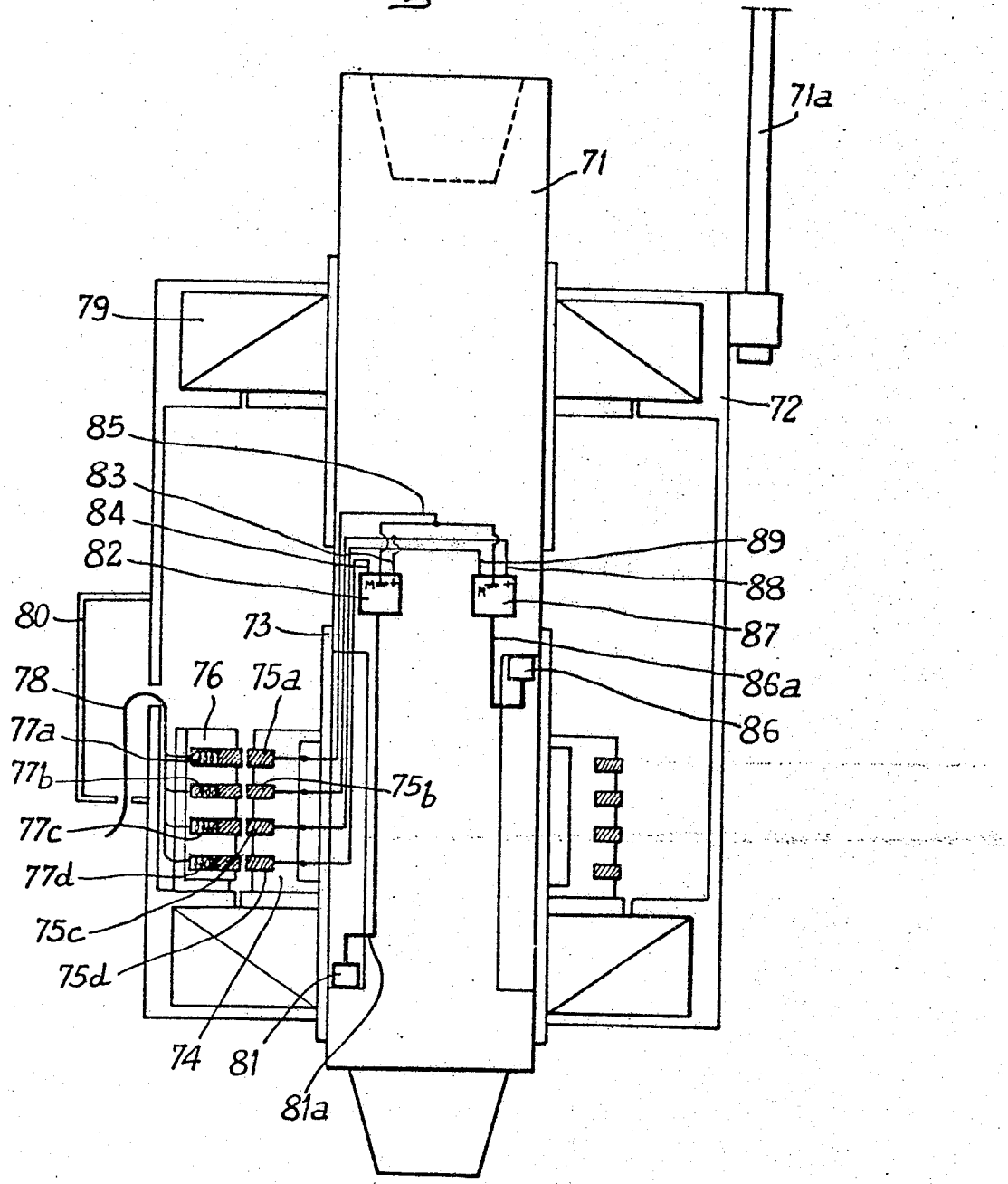
FIG. 7 shows the vibration sensing device at the head of the drilling assembly.
Figure 8:
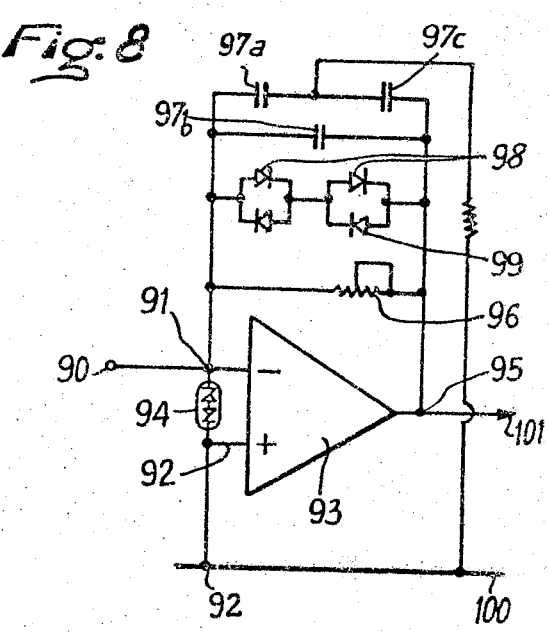
FIG. 8 shows a voltage limiter, used when two accelerometers on opposite phases are used.
Figure 9:
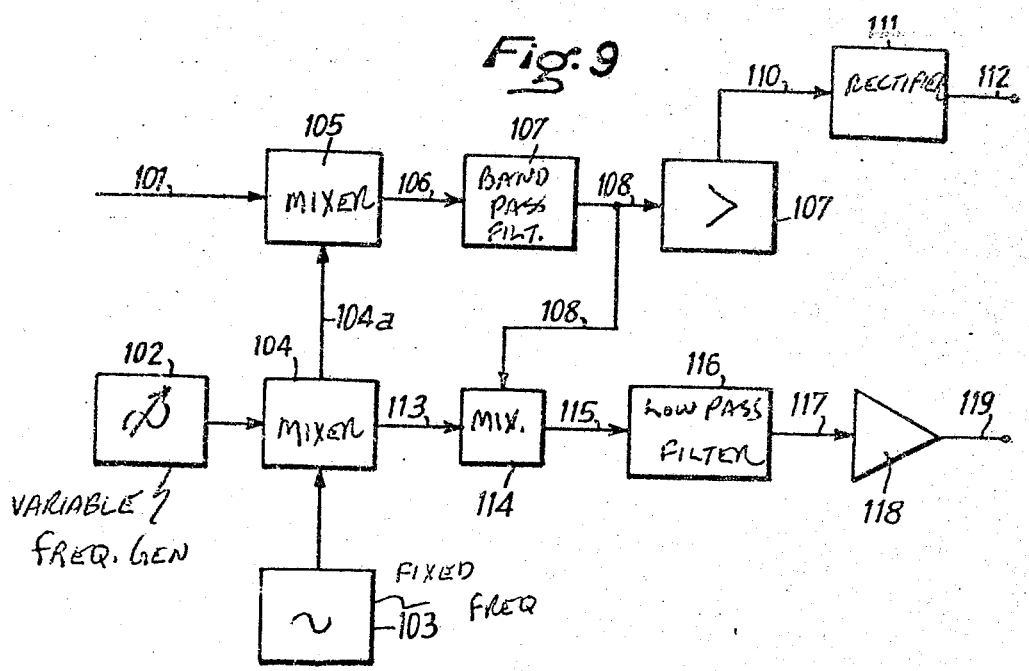
FIG. 9 shows the diagram of the frequency selector which receives the electrical signals from the limiter in the previous figure.

The signals picked up may be processed by means of the apparatus shown in FIGS. 7, 8 and 9. The purpose of this processing is to obtain a frequency spectrum, study of which shows the extent of wear, in accordance with the processes described above. Other processing devices may also be used without going outside the range of the present invention.

FIG. 7 shows the data-gathering unit, in the case where the vibrations emitted by the tool are picked up at the upper end of the drilling assembly.

This sensing device may be moved to the lower end of the assembly, close to the tool, eliminating the rotating collector. In this case the data-gathering system is connected directly to the voltage limiter described in connection with FIG. 8.

A coupling 71 placed between the injection head and the drive rod carries a casing 72, which is held in a fixed position by means of a bracket 71a attached to the injection head. The coupling 71 carries an insulating component 73, which carries a collector 74, on which are placed conducting rings 75a, 75b, 75c and 75d. Opposite the collector 74, and fixed to the casing 72, is an insulating brush-holder, against which press brushes 77a, 77b, 77c and 77d, connected to a multi-conductor cable 78. Stuffing-boxes 79 and a masking component 80 allow a suitable atmosphere to be maintained in the space inside this assembly.

There are two accelerometers 81 and 86, on two shoulders in the coupling, and on two diametrically opposite generating lines. The accelerometer 81 is linked by the cable 81a to a field-effect transistor 82, playing the role of impedance depresser, which is fed by the cable 83; its output is connected to the cable 84, and the mass to the cable 85.

Similarly, the accelerometer 86 is linked by the cable 86a to the transistor 87, which is fed by the cable 88, earthed by the cable 85, and the output of which is connected to the cable 89.

The cable 85 is connected to the ring 75a, the cables 83 and 88 to the ring 75b, and the cables 84 and 89 to the rings 75d and 75c respectively.

The electrical signals representing vibrations are picked up by the cable 78, which is connected to the input of the voltage limiter according to FIG. 10.

In FIG. 8, the inputs 90 and 92 are linked to the cable 78 on the previous figure, and in particular to the units connected to the brushes 77c and 77d. The two inputs 91 and 92 of a differential amplifier 93 thus receive the signals from the accelerometers 81 and 86. The two inputs are decoupled by a diode 94. The differential amplifier thus adds up the signals from these two accelerometers since they are in phase opposition, this resulting from their form of connection.

The amplifier 93 is used with a resistive negative feed-back 96, placed between its output 95 and input 91, to limit its gain, and a filter 97a, 97b, 97c with a cut-out frequency of approximately 5 kHz. In addition, a diode assembly 98 and 99 limits the output voltage of the amplifier to the inverse voltage of the diodes. In the assembly shown in the figure, this inverse voltage is 1.2 volts.

Between the terminals 100 and 101 there is thus a maximum amplitude voltage of 1.2 volts, with a frequency of less than 5 kHz and amplified approximately 20 times in relation to the input voltage. This voltage is applied to the input of the selector filter shown in FIG. 9.

In FIG. 9, a variable frequency generator 102 supplies a variable frequency which can be regulated to the desired level. A fixed frequency generator 103 supplies a stable frequency to a frequency mixer 104 which delivers, through the lines 104a and 113, a frequency equal to the sum of the two frequencies supplied by 102 and 103. Through 104a this sum-frequency is applied to the frequency mixer 105, which also receives the signal 101 with multiple frequency components. The result is a large number of frequencies which are applied by means of the line 106 to a band-pass filter 107, the average frequency of which is strictly identical with the frequency from the generator 103. Only frequencies the same as the frequency from the generator 102 can pass through this filter. Both the sum-frequencies and the frequency difference between 104 and 101 are observed at the frequency-beat mixer output 105. Assuming, for clarification, that the frequency of 103 is 100 kilohertz while the frequency of 102 is 15 hertz, the frequency delivered by 104 will be 100,015 Hz. Assuming that the frequencies from 101 form a continuous spectrum between 0.5 and 200 Hz, two continuous spectra will be obtained at 106, one from 100,015.5 to 100,215 Hz, the other from 100,014.5 to 99,815 Hz. The filter 107, with a width of 2 Hz for instance, will let through only the band from 99,999 to 100,011 Hz. The center of this band corresponds to 100,015-15 Hz. Only the 15 Hz signal will pass with its full amplitude, therefore, corresponding to the frequency of the generator 102. By varying the frequency of this generator, the whole frequency spectrum can be scanned.

The filtered signal is applied along the line 108 to the amplifier 109, which delivers a proportional signal through the line 110. The rectifier 111 provides a direct current, which is measured at 112. The value of this current in relation to the frequency of the generator 102 gives the amplitude spectrum.

The filtered signal is also applied to the mixer 114, which also receives the frequency supplied by 104.

The frequency sum and the frequency difference resulting from the mixing are applied to a low-pass filter 116, which eliminates the sum frequency and lets through only the frequency difference, in other words the frequency of the generator 102 with the amplitude of the corresponding frequency contained in the signal 101.

This frequency is amplified at 118 and is available at 119.

The present invention also relates to a device to perform the process substantially as described above, and with reference to the accompanying drawings.

What we claim is:

1. A process for measuring the amount of wear which has occurred on a drilling tool rotating at a given frequency of rotation, which process comprises the steps of:
   A. detecting naturally occurring vibrations of said tool during a drilling operation,
   B. generating an electrical signal having frequencies representative of the frequencies of the detected vibrations,
   C. selecting a first limited frequency band bracketing one of the first two harmonics of the frequency of maximum amplitude thus generated,
   D. selecting a second limited frequency band in a trough between two harmonics and adjacent the second harmonic of the frequency of maximum amplitude, and
   E. comparing the average amplitude of said selected frequency bands to derive from the ratio between said average amplitudes an indication of said amount of wear.

2. A process as claimed in claim 1 in which said first limited frequency band brackets the first harmonic of said frequency of maximum amplitude.

3. A process as claimed in claim 2 in which said trough is between said first and second harmonics.

4. A process as claimed in claim 2 in which said trough is between said second and third harmonics.

5. A process as claimed in claim 1 in which said first limited frequency band brackets the second harmonic of said frequency of maximum amplitude.

6. A process as claimed in claim 5 in which said trough is between said first and second harmonics.

7. A process as claimed in claim 5 in which said trough is between said second and third harmonics.

8. A process as claimed in claim 1 which comprises the step of amplitude limiting said electrical signal to reduce the effect of noise.

9. A process as claimed in claim 1 in which said selected limited frequency bands are of substantially the same width.

* * * * *